United States Patent
Zou et al.

(10) Patent No.: US 10,189,357 B2
(45) Date of Patent: Jan. 29, 2019

(54) REDUCED RIPPLE CONVERTER FOR HYBRID DRIVE SYSTEMS

(71) Applicant: Ford Global Technologies, LLC, Dearborn, MI (US)

(72) Inventors: Ke Zou, Canton, MI (US); Chingchi Chen, Ann Arbor, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 15/597,248

(22) Filed: May 17, 2017

(65) Prior Publication Data
US 2018/0334043 A1 Nov. 22, 2018

(51) Int. Cl.
| | | |
|---|---|---|
| *B60L 11/18* | (2006.01) | |
| *H02J 3/16* | (2006.01) | |
| *H02J 3/14* | (2006.01) | |
| *H02M 3/158* | (2006.01) | |
| *H02M 1/14* | (2006.01) | |
| *H02M 1/08* | (2006.01) | |
| *H02M 1/00* | (2006.01) | |

(52) U.S. Cl.
CPC ....... *B60L 11/1811* (2013.01); *B60L 11/1816* (2013.01); *H02J 3/14* (2013.01); *H02J 3/16* (2013.01); *H02M 1/08* (2013.01); *H02M 1/14* (2013.01); *H02M 3/1582* (2013.01); *B60Y 2200/91* (2013.01); *B60Y 2200/92* (2013.01); *B60Y 2300/91* (2013.01); *B60Y 2400/112* (2013.01); *H02M 2001/0048* (2013.01); *Y10S 903/903* (2013.01)

(58) Field of Classification Search
CPC .................................................. B60L 11/1811
USPC .......................................................... 320/109
See application file for complete search history.

(56) References Cited

U.S. PATENT DOCUMENTS

| | | | | |
|---|---|---|---|---|
| 6,490,177 B1 * | 12/2002 | Figueroa | ............... | H02M 3/335 363/131 |
| 8,692,532 B2 * | 4/2014 | Lopata | ............... | H02M 3/1588 323/224 |
| 8,717,788 B2 * | 5/2014 | Chen | ...................... | H02M 1/15 363/56.01 |
| 8,810,060 B2 | 8/2014 | Kamaga | | |
| 8,941,266 B2 * | 1/2015 | Boys | ...................... | H02J 5/005 307/104 |
| 2007/0012492 A1 * | 1/2007 | Deng | ...................... | B60K 6/26 180/65.1 |
| 2008/0130322 A1 * | 6/2008 | Artusi | ................. | H02M 1/4225 363/21.01 |
| 2010/0156361 A1 * | 6/2010 | Barrenscheen | ..... | H02M 3/1584 323/272 |
| 2013/0285605 A1 * | 10/2013 | Partovi | ................. | H02J 7/0042 320/108 |

(Continued)

*Primary Examiner* — Suresh Memula
(74) *Attorney, Agent, or Firm* — David Kelley; Brooks Kushman P.C.

(57) ABSTRACT

A powertrain for a vehicle includes a DC/DC converter and a controller. The DC/DC converter includes an inductor and output capacitor and is coupled between a traction battery and an electric drive unit. The controller may be configured to, in response to an electrical connection between the vehicle and an AC grid, couple the output capacitor and inductor in series and across terminals of the traction battery to absorb reactive power from the AC grid.

20 Claims, 8 Drawing Sheets

(56) References Cited

U.S. PATENT DOCUMENTS

| | | |
|---|---|---|
| 2014/0306663 A1 | 10/2014 | Ngo et al. |
| 2015/0061569 A1* | 3/2015 | Alexander .......... B60L 11/1809 320/101 |
| 2016/0268916 A1 | 9/2016 | Ramsay et al. |
| 2016/0268917 A1* | 9/2016 | Ramsay ................ H02M 5/458 |
| 2016/0288660 A1 | 10/2016 | Yang et al. |

* cited by examiner

REDUCED RIPPLE CONVERTER FOR HYBRID DRIVE SYSTEMS

TECHNICAL FIELD

This application is generally related to an electric machine and DC/DC converter system configured to reduce a current ripple during charging of the electric vehicle from an AC grid.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication.

SUMMARY

A powertrain for a vehicle includes a DC/DC converter and a controller. The DC/DC converter includes an inductor and output capacitor and is coupled between a traction battery and an electric drive unit. The controller may be configured to, in response to an electrical connection between the vehicle and an AC grid, couple the output capacitor and inductor in series and across terminals of the traction battery to absorb reactive power from the AC grid.

A method of controlling a powertrain includes, in response to an electrical connection between an AC grid and an electric vehicle containing the powertrain, modulating by a controller a high-side switch of a DC/DC converter according to reactive power from the AC grid to pass power though an inductor of the DC/DC converter to absorb a portion of the reactive power in an output capacitor of the DC/DC converter.

A powertrain for a vehicle includes a controller that may be configured to, in response to an electrical connection between the vehicle and an AC grid, couple an output capacitor and inductor of a DC/DC converter in series and across terminals of a traction battery to absorb reactive power from the AC grid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A single phase alternate current (AC) charger for electric vehicles typically passes an AC ripple at various frequencies. Typically, the most noticeable frequency component is the component at twice the grid or line frequency, and the grid input power has a pulsing shape with a dc offset (Pin_dc), a large AC component at twice the line frequency and a peak to peak value of 2(Pin_dc). This power ripple causes a current ripple at twice the grid frequency on the battery side such that extra circuitry may be required to protect the battery. Also, there are current ripples at other frequencies, such as different orders of harmonics due to grid distortion and the switching frequency of a charger's semiconductor switches. To filter these ripples, a large dc-link capacitor is required in the charger. This bulk capacitor increases the cost, volume and weight of the charger.

As the electric vehicle is not in motion during AC grid charging, its electrical drive system (e.g., powertrain or E-drive system), which includes a traction drive inverter and an electric machine, is typically disconnected from the battery. Here, a DC/DC converter is operated to absorb reactive power in the an apparatus and method is presented that utilizes the E-drive system and operates it as a low frequency current compensator during charging. A powertrain is disclosed that includes a capacitor that is selectively coupled between a neutral terminal of a wye wound electric machine and a negative terminal of the motor inverter. In another embodiment, the controller for the powertrain is configured to modulate switches of the inverter during AC grid charging, at a frequency greater than the line frequency, to flow a current through one phase winding of the electric machine such that the current returns via a different phase winding of the electric machine.

Figure 1:
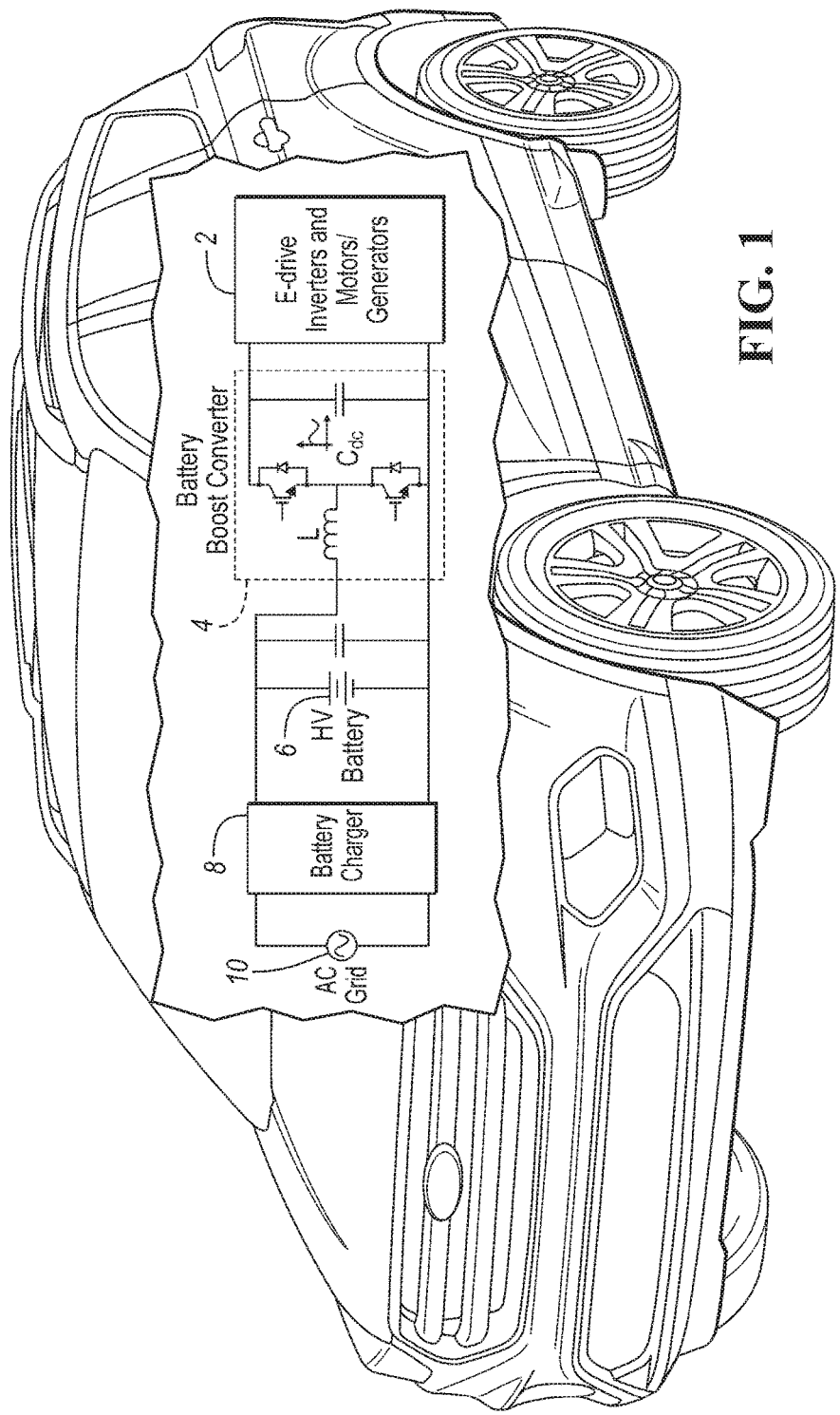
FIG. 1 is a diagram of an electrified vehicle with an electric machine and a DC/DC converter configured to reduce a current ripple during charging of the electric vehicle from an AC grid.

FIG. 1 depicts a hybrid electric vehicle illustrating internal electric powertrain components including an electric drive unit 2 (e.g., an electric machine and inverter), a DC/DC converter 4, a high-voltage battery 6, and a battery charger 8. The battery charger 8 may be integrated internally with the vehicle or may be outside of the vehicle along with an AC power grid 10. During charging of the vehicle, current flows through an inductor L of the boost converter 4 and to a dc bus capacitor Cdc via a high-side switch that is modulated to control the flow of current. Here, the electric drive unit 2 may be configured as an open circuit. In one embodiment, a controller (e.g., the battery boost converter controller) may selectively engage or couple the dc bus capacitor Cdc in series with the inductor L such that the series combination is across terminals of the high-voltage battery 6. The controller may modulate the switches of the battery boost converter at a frequency greater than the line frequency to reduce a ripple current based on the line frequency and harmonics of the line frequency. Here, a controller (e.g., the electric machine inverter controller) may selectively modulate switches of the converter 4 to absorb reactive energy from the AC grid 10. The modulation of the high-side switch of the converter 4 may be done to absorb the reactive energy in the capacitor Cdc and/or in the inductor L.

Figure 2:
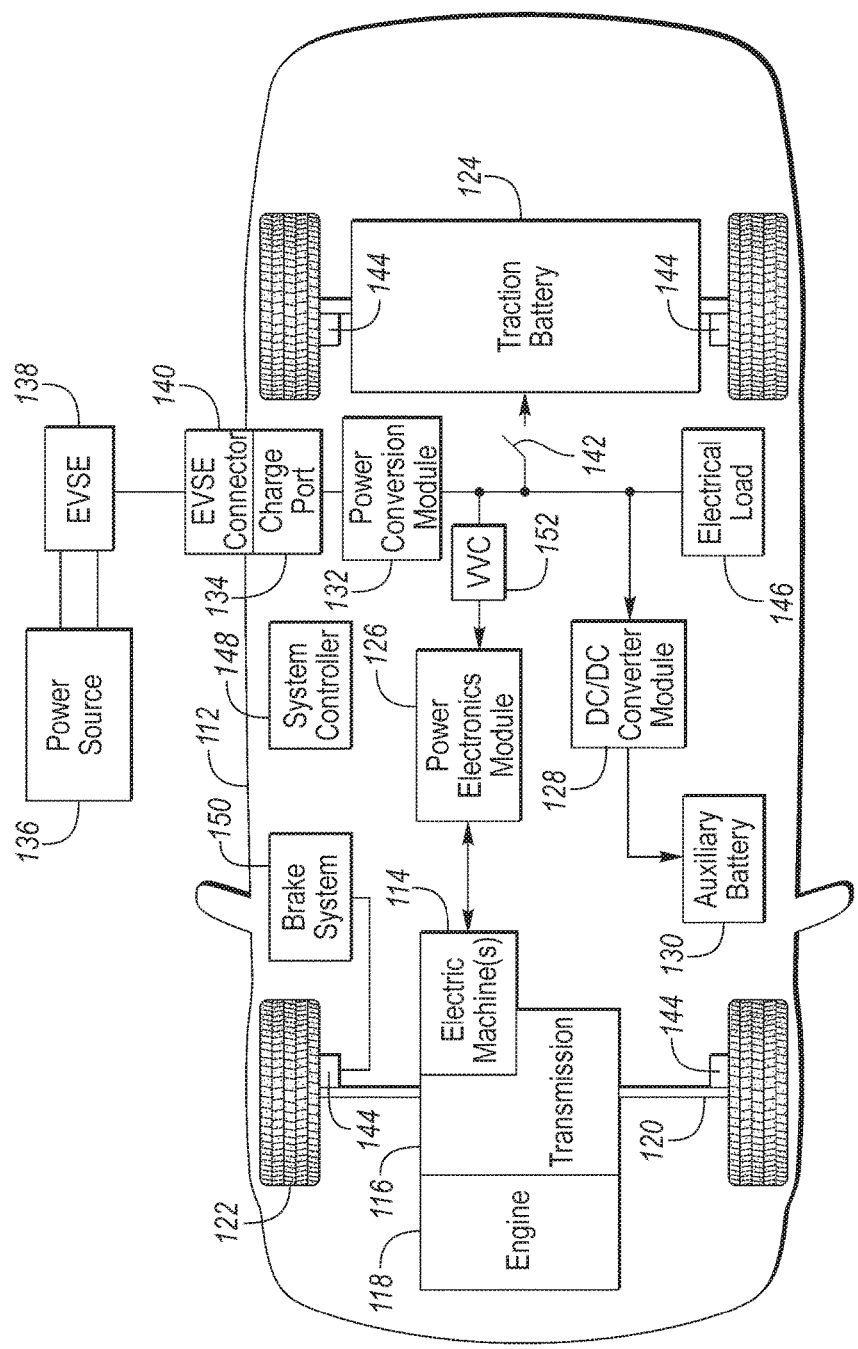
FIG. 2 is a diagram of a hybrid vehicle illustrating typical drivetrain and energy storage components including AC grid charging components.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 3:
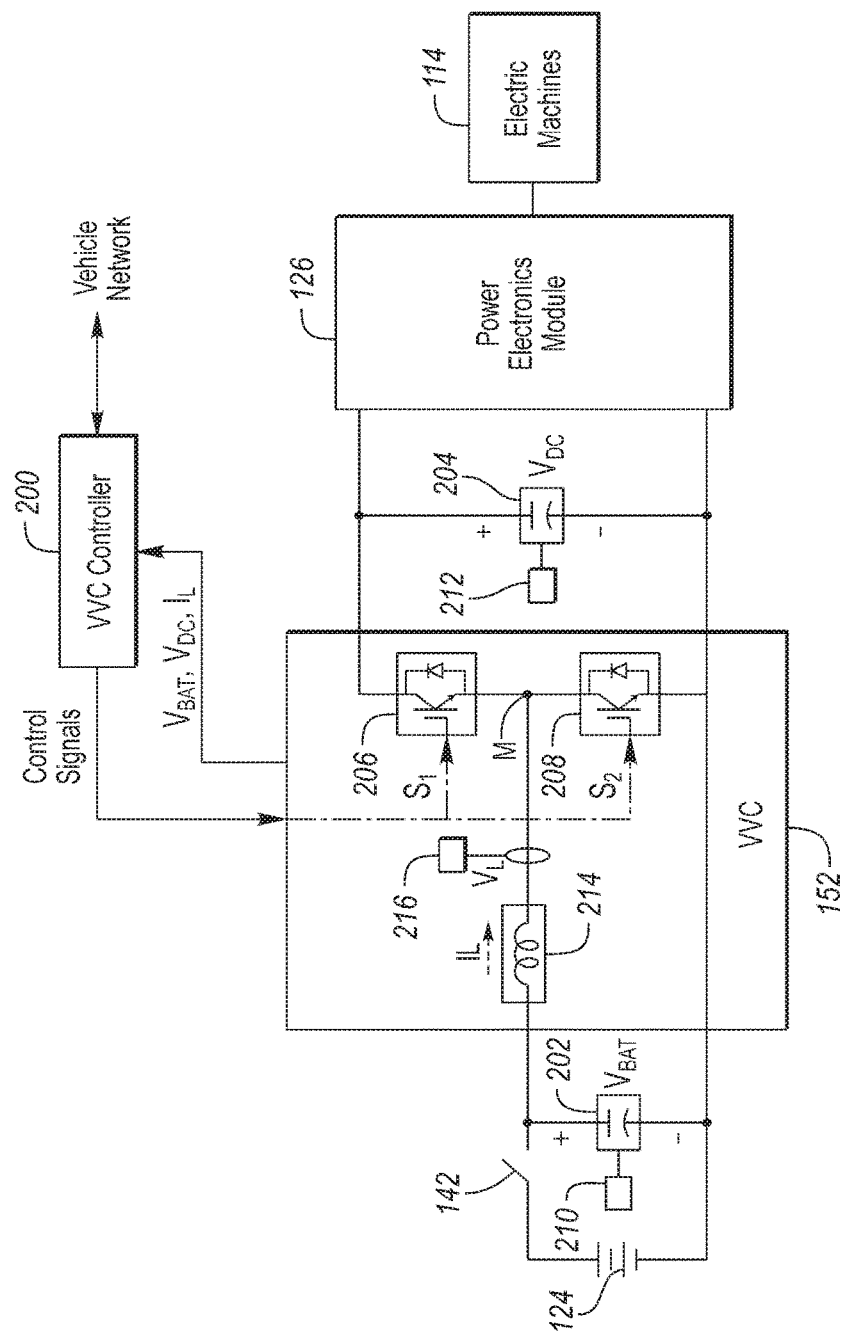
FIG. 3 is a schematic diagram of a vehicular DC/DC converter.

FIG. 3 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \quad (1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 3, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 3, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition.

The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214, often referred to as a boost inductor, may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208). The use of complementary control of the switching devices 206, 208 is desirable to avoid a shoot-through condition in which current flows directly through a high-side switching device 206 and a low-side switching device 208. The high-side switching device 206 is also called a pass device 206 and the low-side switching device 208 is also called a charging device 208.

Figure 5:
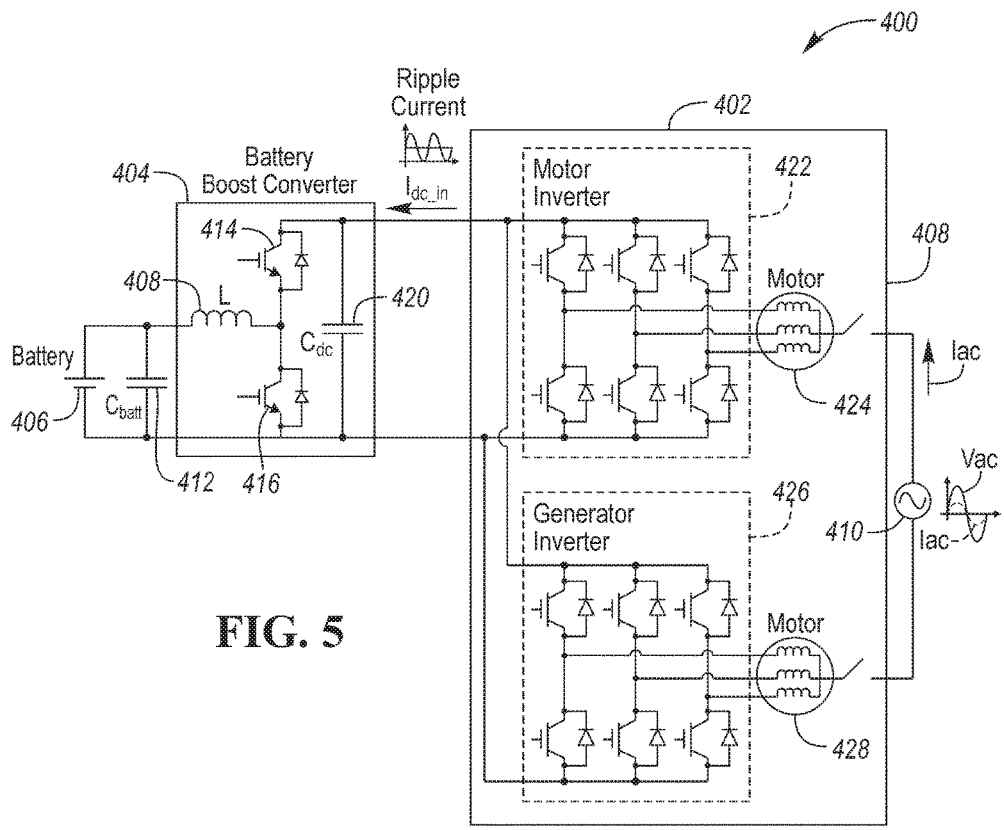
FIG. 5 is a schematic diagram of a power-split hybrid vehicle powertrain including an integrated AC grid charger, a traction battery, and a converter configured to channel reactive power to a DC bus capacitor.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the variable voltage converter 152. The switching frequency may also be based on parasitic inductance associated with the gate of the IGBT.

Figure 4:
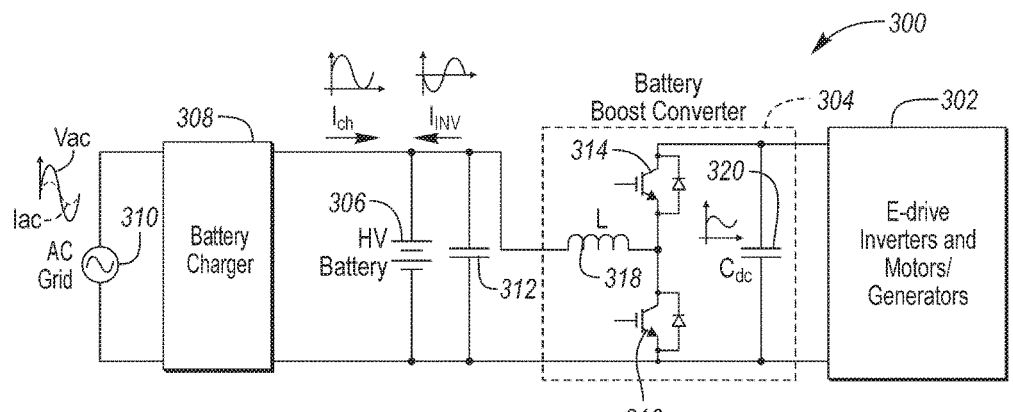
FIG. 4 is a schematic diagram of a hybrid vehicle powertrain including an AC grid charger, a traction battery and a converter configured to channel reactive power to a DC bus capacitor.

FIG. 4 is a schematic diagram 300 of a hybrid vehicle powertrain including an AC grid 310, a battery charger 308, a traction battery 306, a DC/DC converter 304, and an electric drive unit 302. The electric drive unit 302 includes an electric machine and an inverter to drive the electric machine. During propulsion, the DC/DC converter 304 is configured to boost a voltage of the battery to an operating voltage across the DC bus capacitor 312, and during charging, the DC/DC converter 304 is configured to channel reactive power to the DC bus capacitor 312. Generally a battery boost converter is used to boost the lower battery voltage to higher dc bus voltage to realize easier electric motor control and better efficiency in many hybrid electric vehicles (HEV) and some battery electric vehicles. This illustration is of an independent single phase charger that may be an AC Level 1, Level 2 or Level 3 single phase charger. Here, the battery boost converter 304 also referred to as a DC/DC converter or a variable voltage converter (VVC) includes a high-side switch 314, a low side switch 316, an inductor 318 and the DC bus or output capacitor 320. The high-side and low-side switches (314, 316) typically are solid state devices (SSDs), such as Insulated Gate Bipolar junction Transistors (IGBTs), Metal Oxide Semiconductor Field Effect Transistors (MOSFETs), or Bipolar Junction Transistors (BJTs) which are widely used in a variety of automotive and industrial applications, such as electric motor drives, power inverters, DC-DC converters, and power modules. The operation of an IGBT and a MOSFET is voltage controlled, in which the operation is based on a voltage applied to a gate of the IGBT or MOSFET, while operation of a BJT is current controlled, in which the operation is based on a current applied to a base of the BJT.

Here, the use of SSDs or high-power relays may be used to control, alter, or modulate a current between a battery and an electric machine/electric drive unit 302 of the vehicle. However, when charging, the switches (314, 316) may be modulated to reduce a power ripple. The ripple reduction method directs the reactive ripple power to the dc-link capacitor 320 in the battery boost converter 304 by utilizing its semiconductors switches (314, 316). Often frequencies other than the grid frequency are considered, for example, a focus is on the ripple at twice the grid frequency may be selected as this frequency component is typically the most severe ripple component (e.g., in the case of the input voltage and current having unity power factor, which is the case for most commercial chargers). However, this method and structure may be used for non-unity power factor cases, and for other frequency components by adjusting a inductance value, a capacitor value, a modulation duty cycle, and modulation frequency as the E-drive system is not operating during charging and the ripples passes through the charger to the battery side.

FIG. 5 is a schematic diagram of a power-split hybrid vehicle powertrain including an AC grid charger, a traction battery, and a converter configured to channel reactive power to a DC bus capacitor. This system is an integrated charger of electric vehicles that utilized the on-board electric drive system to accomplish the battery charging functions. In this topology, the windings of electric motors and generators function as inductors, and their corresponding inverters are commanded to realize power factor correction (PFC) function.

In FIG. 5, a hybrid vehicle powertrain 400 includes an electric drive unit 402 that may be configured to provide torque to drive a wheel of the vehicle or generate a current by utilizing rotational force of the wheel. In the electric drive unit 402, an electric machine 424 is coupled with an electric machine inverter 422 that converts an AC current to a direct current (DC) current. In this example, the electric drive unit 402 also includes a generator 428 coupled with a generator inverter 426. During operation of the vehicle, a high voltage traction battery 406, that may have a smoothing capacitor 412 coupled in parallel, is used to provide a propulsive force to rotate the electric machine and store energy captured by the electric machine from rotational energy of the wheel. When the vehicle is not in motion it may be desirable to increase the battery 406 state of charge (SOC) by coupling the battery 406 with an AC power grid 410 via a battery charger, that is in this example the electric drive unit 402. One artifact of the use of the AC grid 410 is that harmonics of the grid frequency may result in peak voltages propagated to the battery and components of the powertrain 400. Here, the DC/DC or battery boost converter 404 includes an inductor 408, a high-side switch 414, a low-side switch 416, and a capacitor 420. When charging, the electric drive unit 402 may engage a neutral terminal of the motor 424 and the generator 428 with the AC grid 410 and modulate switches of the motor and generator inverters 422/426 to pass reactive power through the inductive windings of the electric machines 424/428. This allows a current flowing through the windings of the electric machines 424/428 to flow to the battery boost converter 404 such that it may be absorbed by the capacitor 420 and the inductor 408 when engaged by the switch 414. The current is controlled via the pull-up switch (e.g., 414) and the pull-down switch (e.g., 416)

The battery charger may be an AC Level 1, Level 2 or Level 3 charger as defined by the Society of Automotive engineers (SAE) such as described in SAE J1772 and other SAE specifications. Here, the high-side switch 414, which may be a relay, IGBT, MOSFET, or other solid state switch, selectively couples the capacitor Cdc 420 across the terminals of the battery in series with the inductor L 408 of the battery boost converter 404. While the vehicle is coupled with the AC grid and not in motion, the stator windings of the electric machines 424/428 may be used to carry current to the boost converter 404 via the inverters 422/426. The inverters 422/426 may modulated the switches or may statically engage switches to channel the current, while the switches 414/416 of the converter 404 may modulate at a frequency fsw that is greater than the line frequency of the ac grid 410. The frequency fsw may be greater than 20 times (e.g., 1 KHz, 1.2 KHz, 2 KHz, 2.4 KHz, 5 KHz, or 6 KHz) the line frequency (e.g., 50 Hz or 60 Hz).

The smoothing capacitor Cdc 420 is used as energy storage device to absorb ripple power. The inductance L 408 is used to transfer the reactive energy to the capacitor 420 and not typically used as an energy storage device. Depending upon the value of the inductance of the inductor 408, the switching frequency and a low frequency ripple magnitude, the inductor 408 may operate in a discontinuous mode or continuous mode. It should be noted that the operation of the switches of the inverters 422/426 is such that no steady state rotational torque is applied to the electric machine as any transient torques produced by the fields induced will generally be equal and opposite or balanced such that the rotational torque is substantially zero. For example, flowing the same (balanced) current through all phases of an electric machine will generate a balanced uniform field in the electric machine such that minimal or no rotational torque results. Further, the switches of the inverters 422/426 may be modulated to compensate for the rotor position and differences in characteristics of the electrical components of the inverter (e.g., switches, diodes, and connections) and phases of the electric machine.

Figure 6:
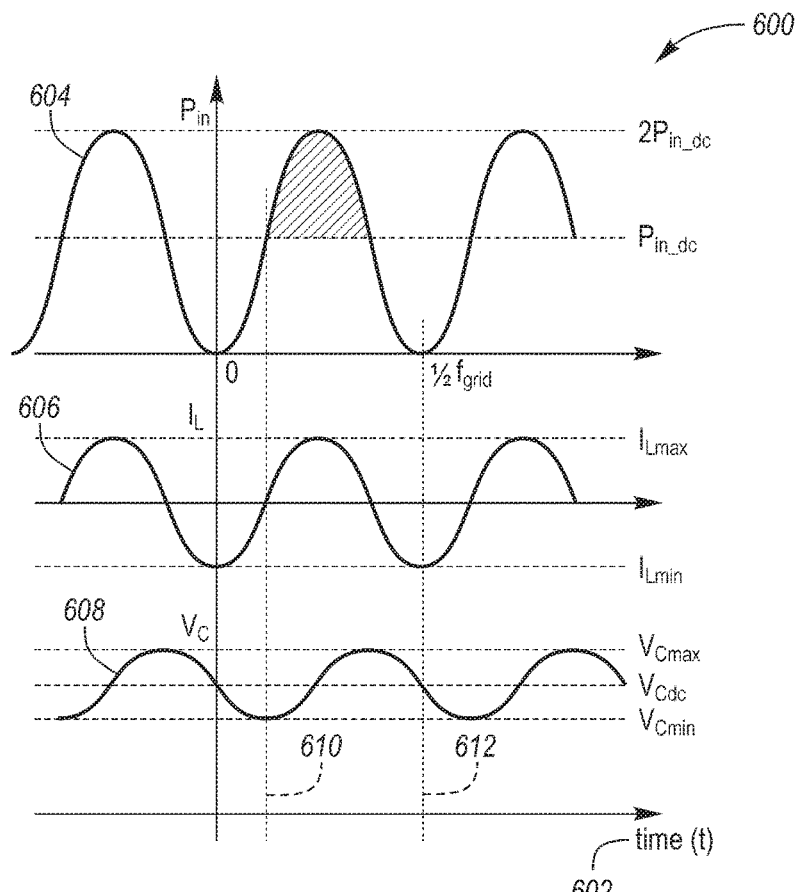
FIG. 6 is a graphical representation of AC characteristics of charging and variable voltage converter components during AC charging of a hybrid vehicle.

FIG. 6 is a graphical representation of AC characteristics 600 of charging and powertrain components during AC charging of a hybrid vehicle with respect to time 602. An input power 604, inductor current 606 and bulk DC capacitor voltage 608 are graphically shown with respect to time 602. At time 610, the current is zero when the input DC power is equal to the grid power, and at time 612 at ½ the grid frequency, the input power is zero when the current is at a minimum. These waveforms of the input power, inductor current and capacitor voltage (only DC and twice the grid frequency components are shown). During this measurement, the battery charger is operated such that an input voltage and current to the battery charger achieves unity power factor, but in most cases, a typical commercial charger may not achieve a unity power factor. However, in non-unity power factor cases and systems having other frequency components, these control methods and circuits may be applied.

For calculation purposes, assume that all AC side low frequency ripples are passed to the battery side through the charger. The input power may then be based on:

$$P_{in} = P_{in\_dc} \times (1 + \cos(2 f_{grid} \times 2\pi t)) \qquad (1)$$

The reactive energy to be absorbed by the output capacitor $C_{batt}$ may be calculated based on:

$$\Delta E_{Cap} = \int_0^{1/4 f_{grid}} P_{in\_dc} \times \cos(2\pi \times 2 f_{grid} t) dt = \frac{P_{in\_dc}}{2\pi f_{grid}} J \qquad (2)$$

The voltage swing of the capacitor may be calculated based on:

$$\Delta V_c = \frac{P_{in\_dc}}{4\pi f_{grid} \times C_{dc} \times V_{C\_dc}} \qquad (3)$$

$$C_{dc} = \frac{P_{in\_dc}}{4\pi f_{grid} \times \Delta V_c \times V_{C\_dc}} \qquad (4)$$

Equation (4) provides a guideline for the capacitor selection. For example, consider a 3.3 KW charger with a 60 Hz grid frequency, a 400V capacitor dc voltage and 50 V capacitor voltage ripple, (3,300/(4*π*60*50*400)) thus a 200 uF capacitor may be used to satisfy the requirement of equation 4.

Figure 7:
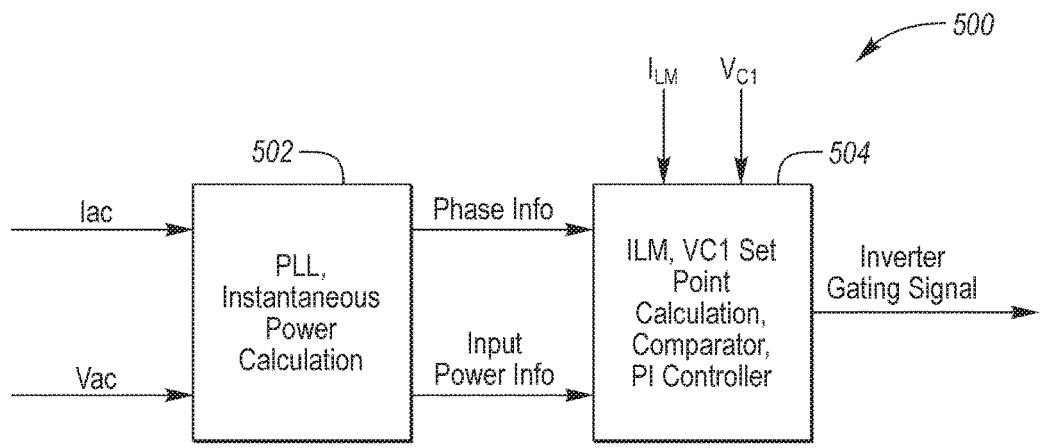
FIG. 7 is a diagram of a control system for a hybrid vehicle converter.

FIG. 7 is a block diagram of a control system converter signal flow 500 for a hybrid vehicle during AC charging. The control of the converter is performed to direct the reactive power of the charging operation from the AC grid to the DC bus or output capacitor. Here, sensing items on the grid side may include voltage/current (e.g., Iac and Vac) which may be calculated by a first control block 502 (e.g., an AC charger controller) to produce phase information and input power data. The phase information and input power data may be communicated to a second control block 504 that may be located within the vehicle and used along with sensing information which may include current of the inductor Lm (Ilm) and a voltage of the capacitor (Vc1). The output of this control flow is a converter gating signal that is used to couple the capacitor $C_1$ (e.g. output capacitor 420) between the neutral terminal of the electric machine and the negative terminal of the inverter. Further, this converter gating signal may also be used to control switches of the inverter (e.g., switches inside motor inverter 422 and generator inverter 426) along with the switches in the converter (e.g., 404).

Figure 8:
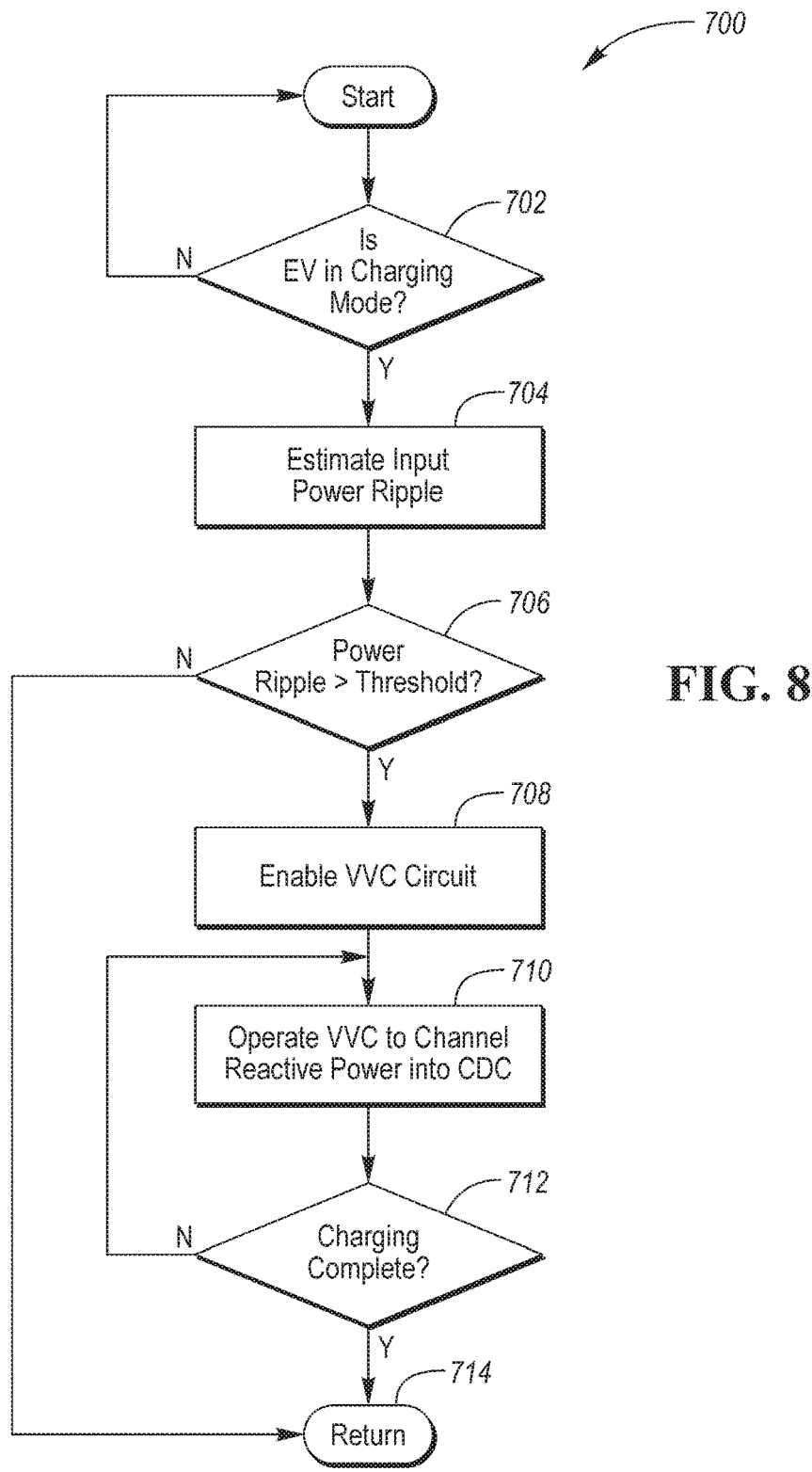
FIG. 8 is a flow diagram of a control system for a converter to channel reactive power to a DC bus capacitor.

FIG. 8 is a flow diagram 700 of a control system for a DC/DC converter to channel reactive power to an output or DC bus capacitor. In operation 702 a controller branches based on an operational mode of a hybrid vehicle. If the vehicle is not in a charging mode, the controller will branch back to operation 702. If the operational mode is a charging mode, the controller branches to operation 704.

In operation 704, the controller calculates the input power ripple (e.g., Pin as shown in FIG. 6) and an operating loss of the inverter and proceeds to operation 606. In operation 606, the controller branches based on the input power ripple exceeding a threshold. The threshold may be based on a predetermined value, for example the predetermined value may include the maximum allowable ripple value to the battery or the predetermined value may be determined by the charging efficiency requirement and the converter circuit loss. If the input power ripple is less than the threshold, the controller will exit, and if the input power ripple is greater than the threshold, then the controller will branch to operation 708.

In operation 708 the controller couples an output capacitor between terminals of the battery to 'balance' the reactive power. After the balancing capacitor is coupled, the controller proceeds to operation 710.

In operation 710, the controller operates the converter to channel reactive power from the charging operation to the output capacitor via the switches of the converter. In an embodiment without the output capacitor, the controller operates the converter to channel reactive power through inductor of the converter. After the controller proceeds to operation 712. In operation 712, the controller branches in response to a status of the charging, if the charging is not complete, the controller will branch to operation 710 and continue to operate the inverter. If the charging is complete, the controller will exit at operation 714.

Figure 9:
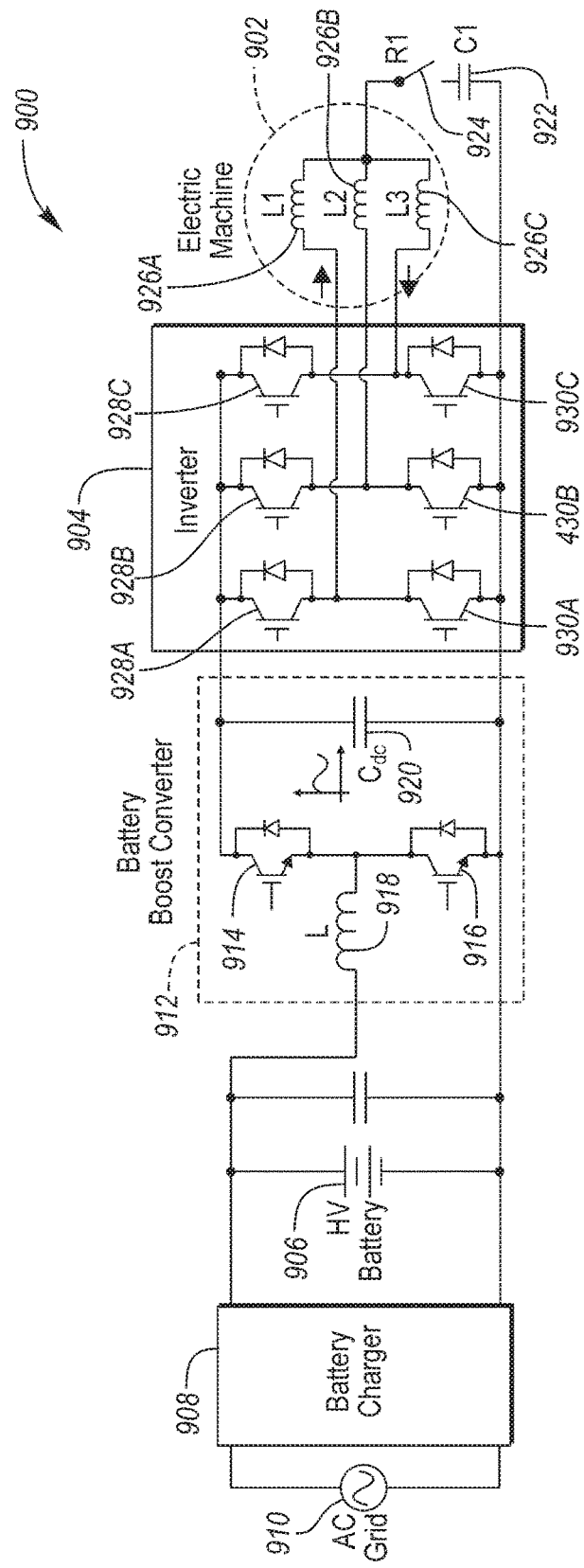
FIG. 9 is a diagram of a hybrid vehicle powertrain including an AC grid charger, a DC/DC converter, a traction battery and an inverter/motor having a balancing capacitor.

FIG. 9 is a diagram of a hybrid vehicle powertrain 900 including electric machine 902 that may be configured to provide torque to drive a wheel of the vehicle or generate a current by utilizing rotational force of the wheel to rotate the electric machine 902. The electric machine is coupled with an electric machine inverter 904 that converts an AC current to a direct current (DC) current. During operation of the vehicle, a high voltage traction battery 906 is used to provide a propulsive force to rotate the electric machine, and store energy captured by the electric machine from rotational energy of the wheel. When the vehicle is not in motion it may be desirable to increase the battery 906 state of charge (SOC) by coupling the battery 906 with an AC power grid 910 via a battery charger 908. One artifact of the use of the AC grid is that harmonics of the grid frequency may result in peak voltages propagated to the battery and components of the powertrain. As a required operating voltage of the inverter 904 and electric machine 902 may be different than the voltage of the battery 906, a DC/DC converter 912 may be used to increase/decrease or boost/buck the battery voltage to the operating voltage. The DC/DC converter 912 also referred to as a variable voltage converter (VVC) may include a high-side switch 914, a low-side switch 916, an inductor 918, and an output capacitor 920. The high-side and low-side switches (914, 916) typically are solid state devices (SSDs), such as Insulated Gate Bipolar Junction Transistors (IGBTs), Metal Oxide Semiconductor Field Effect Transistors (MOSFETs), or Bipolar Junction Transistors (BJTs) which are widely used in a variety of automotive and industrial applications, such as electric motor drives, power inverters, DC-DC converters, and power modules. The operation of an IGBT and a MOSFET is voltage controlled, in which the operation is based on a voltage applied to a gate of the IGBT or MOSFET, while operation of a BJT is current controlled, in which the operation is based on a current applied to a base of the BJT.

During propulsion, the DC/DC converter 912 is configured to boost a voltage of the battery to an operating voltage across the DC bus capacitor 920, and during charging, the DC/DC converter 912 is configured to channel reactive power to the DC bus capacitor 920. Generally a battery boost converter is used to boost the lower battery voltage to higher dc bus voltage to realize easier electric motor control and better efficiency in many hybrid electric vehicles (HEV) and some battery electric vehicles. This illustration is of an independent single phase charger that may be an AC Level 1, Level 2 or Level 3 single phase charger as defined by the Society of Automotive engineers (SAE) such as described in SAE J1772 and other SAE specifications.

Here, a capacitor 922 is selectively coupled with the neutral terminal of the electric machine 902 via switch 924 and the switches (928A, 928B, 928C, 930A, 930B, and 930C) of the inverter 904 are modulated to pass reactive power through the inductive windings 926A, 926B, and 926C of the electric machine 902. This allows a current flowing through the windings of the electric machine 926A, 926B, and 926C to flow to be absorbed by the capacitor 920 when engaged by the switch 924. The current is controlled via pull-up switches 928A, 928B, and 928C and pull-down switches 930A, 930B, and 930C, these switches are also referred to as high-side switches 928A, 928B, and 928C and low-side switches 930A, 930B, and 930C. Here, the switch R1 924, which may be a relay, IGBT, MOSFET, or other solid state switch, selectively couples the capacitor C1 922 between the neutral terminal of the elected machine 902 and the negative bus of the inverter 904. While the vehicle is coupled with the AC grid and not in motion, the electric machine stator windings (i.e., inductors L1, L2, and L3). The inverter modulated the switches (928 and 930) at a frequency fsw that is greater than the line frequency of the ac grid 910. The frequency fsw may be greater than 20 times (e.g., 1 KHz, 1.2 KHz, 2 KHz, 2.4 KHz, 5 KHz, or 6 KHz) the line frequency (e.g., 50 Hz or 60 Hz).

The smoothing capacitor C1 922 is used as energy storage device to absorb ripple power. The inductor Lm represents the winding inductance of the electric machine 902. The inductance Lm is used to transfer the reactive energy to the capacitor 922 and not typically used as an energy storage device. Depending upon the value of the inductance of the windings (926A, 926B, and 926C), the switching frequency and a low frequency ripple magnitude, the inductor may operate in a discontinuous mode or continuous mode.

The switches in the three phase legs are divided into two groups: the upper three switches (928A, 928B, and 928C) and the lower three switches (930A, 930B, and 930C). Within each group, the switches can operate in different modes. For example, in a first "parallel" mode, the three switches (e.g., the upper switches or the lower switches) act simultaneously such that all upper switches are activated equally and all lower switches are activated equally. Another mode is an "interleaving" mode in which the three switches (e.g., the upper switches or the lower switches) operate in ⅓ of switching cycle apart. A third "selective" mode is such that only one or two switches operates at a given time. Although this has been illustrated using 3-phase electric machines, this invention is not limited to a 3-phase electric machine as it may also be implemented in a 6-phase, 9-phase, or other poly-phase electric machine in which the balancing capacitor is coupled between a neutral terminal of the poly-phase electric machine and a negative terminal of the inverter for the electric machine. The operation of the switches is such that no steady state rotational torque is applied to the electric machine as any transient torques produced by the fields induced will generally be equal and opposite in some embodiments or will be balanced such that the rotational torque is substantially zero. For example, flowing the same (balanced) current through all phases of an electric machine will generate a balanced uniform field in the electric machine such that minimal or no rotational torque results. Further, the switches may be modulated to compensate for the rotor position and differences in characteristics of the electrical components of the inverter (e.g., switches, diodes, and connections) and phases of the electric machine (e.g., 926A, 926A, and 926A).

Figure 10:
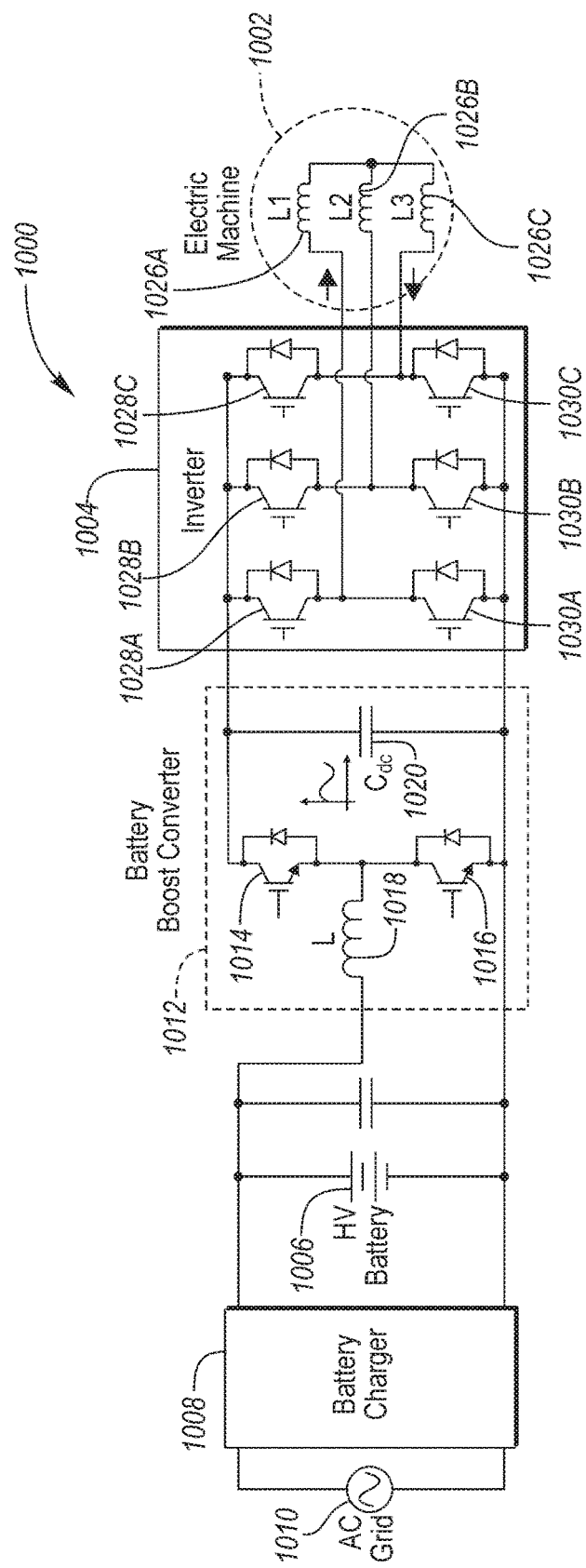
FIG. 10 is a diagram of a hybrid vehicle powertrain including an AC grid charger, a DC/DC converter, a traction battery and an inverter/motor configured to balance power during charging.

FIG. 10 is a diagram of a hybrid vehicle powertrain 1000 including electric machine 1002 that may be configured to provide torque to drive a wheel of the vehicle or generate a current by utilizing rotational force of the wheel to rotate the electric machine 1002. The electric machine is coupled with an electric machine inverter 1004 that converts an AC current to a direct current (DC) current. During operation of the vehicle, a high voltage traction battery 1006 is used to provide a propulsive force to rotate the electric machine and store energy captured by the electric machine from rotational energy of the wheel. When the vehicle is not in motion it may be desirable to increase the battery 1006 state of charge (SOC) by coupling the battery 1006 with an AC power grid 1010 via a battery charger 1008. One artifact of the use of the AC grid is that harmonics of the grid frequency may result in peak voltages propagated to the battery and components of the powertrain. As a required operating voltage of the inverter 1004 and electric machine 1002 may be different than the voltage of the battery 1008, a DC/DC converter 1012 may be used to increase/decrease or boost/buck the battery voltage to the operating voltage. The DC/DC converter 1012 also referred to as a variable voltage converter (VVC) may include a high-side switch 1014, a low-side switch 1016, an inductor 1018, and an output capacitor 1020. The high-side and low-side switches (1014, 1016) typically are solid state devices (SSDs), such as Insulated Gate Bipolar Junction Transistors (IGBTs), Metal Oxide Semiconductor Field Effect Transistors (MOSFETs), or Bipolar Junction Transistors (BJTs) which are widely used in a variety of automotive and industrial applications, such as electric motor drives, power inverters, DC-DC converters, and power modules. The operation of an IGBT and a MOSFET is voltage controlled, in which the operation is based on a voltage applied to a gate of the IGBT or MOSFET, while operation of a BJT is current controlled, in which the operation is based on a current applied to a base of the BJT.

During propulsion, the DC/DC converter 1012 is configured to boost a voltage of the battery to an operating voltage across the DC bus capacitor 1020, and during charging, the DC/DC converter 1012 is configured to channel reactive power to the DC bus capacitor 1020. Generally a battery boost converter is used to boost the lower battery voltage to higher dc bus voltage to realize easier electric motor control and better efficiency in many hybrid electric vehicles (HEV) and some battery electric vehicles. This illustration is of an independent single phase charger that may be an AC Level 1, Level 2 or Level 3 single phase charger as defined by the Society of Automotive engineers (SAE) such as described in SAE J1772 and other SAE specifications.

One artifact of the use of the AC grid is that harmonics of the grid frequency may result in peak voltages propagated to the powertrain. Here, a current may be directed through at least one of the phases of the electric machine 1002 via the inverter 1004. A current may be directed to flow through at least one winding of the electric machine (e.g., 1026A, 1026B, and 1016C) and then return via a different winding of the electric machine. The current is controlled via pull-up switches 1028A, 1028B, and 1028C and pull-down switches 1030A, 1030B, and 1030C. For example, a current may be directed to flow through a first phase 1026A via turning-on a first switch 1028A and the current may then return via a second phase 1026B via turning-on a second switch 1030B. In an alternative embodiment, the current may return via a second phase 1026B and a third phase 1026C via turning-on a second switch 1030B and a third switch 1030C.

An equivalent circuit for FIG. 10 is basically an H-bridge with an inductor across the bridge. The inductor Lm represents the equivalent winding inductance of the phases in either series or parallel dependent upon the switch configuration, which may have different values depending on different circuit configurations. The pull-up switches 1028A, 1028B, and 1028C and pull-down switches 1030A, 1030B, and 1030C form a full bridge inverter and are controlled to generate the inductor current $I_{Lm}$. The pull-up switches 1028A, 1028B, and 1028C and pull-down switches 1030A, 1030B, and 1030C may be operated at a frequency fsw that may be much higher (>20 times) than the line frequency of the AC grid. And the pull-up switches 1028A, 1028B, and 1028C and pull-down switches 1030A, 1030B, and 1030C may be controlled such that the inductor current $I_{Lm}$ tracks the input power to compensate for the reactive power components thereof. Although this has been illustrated using 3-phase electric machines, this embodiment is not limited to a 3-phase electric machine as it may also be implemented in a 6-phase, 9-phase, or other poly-phase electric machine in which a current flows out at least one phase and returns via at least one different phase. The operation of the switches is such that no steady state rotational torque is applied to the electric machine as transient torques produced by the fields induced will generally be equal and opposite in some embodiments or will be balanced such that the rotational torque is substantially zero. For example, flowing the same (balanced) current through one phase of an electric machine and returning the current via a separate different phase to generate a balanced uniform field in the electric machine such that minimal or no rotational torque results. Another example is flowing a current through one phase of an electric machine and returning the current via the two remaining phases to generate a balanced uniform field in the electric machine such that minimal or no rotational torque results. Further, the switches may be modulated to compensate for the rotor position and differences in characteristics of the electrical components of the inverter (e.g., switches, diodes, and connections) and phases of the electric machine (e.g., 1026A, 1026A, and 1026A).

In the following analysis, it is also assumed that the input voltage and current have unity power factor, which is the case for most commercial chargers. However, for non-unity power factor case, and for other frequency component, the analysis will be similar. Here, two cases are investigated, first when $I_{Lm}$ has a large DC value plus AC ripples, and second when $I_{Lm}$ has no or small DC value plus AC ripples.

In the case in which $I_{Lm}$ has a large DC value plus AC ripples, the inductor current is always positive and the AC component of the inductor current $I_{Lm}$ tracks the input reactive power to compensate for the grid side ripple. Here, the current ripple on the inductor may be calculated based on:

$$\Delta I_L = \frac{P_{in\_dc}}{4\pi f_{grid} \times L_m \times I_{L\_dc}} \tag{5}$$

In which the required inductance of the motor stator windings may be based on:

$$L_m = \frac{P_{in\_dc}}{4\pi f_{grid} \times \Delta I_L \times I_{L\_dc}} \tag{6}$$

Equation 6 provides a guideline for a recommended inductance. For example, for a 3.3 KW charger with 60 Hz grid frequency, 50 A current ripple and 400 A inductor DC current, a 200 uH equivalent inductance of the stator windings may be used to satisfy the requirement.

The control of the inverter is to direct the low frequency reactive power to the inductor. The sensing items on the grid side may include voltage/current (e.g., Iac and Vac) that may be used to produce phase information and input power data. The phase information and input power data may be used along with vehicle sensing information which may include current of the inductor Lm (Ilm).

The second case when $I_{Lm}$ has no or small dc value plus ac ripples, the inductor current may go negative. And the AC component of the inductor current tracks the input reactive power to compensate for the grid side ripple. Unity power factor input power may be based on the following equations:

$$P_{in\_ac} = P_{in\_dc} \cos(2f_{grid} \times 2\pi t)) \tag{7}$$

$$E_{in\_ac} = \frac{P_{in\_dc}}{4\pi f_{grid}}(1 + \sin(2f_{grid} \times 2\pi t)) \tag{8}$$

$$I_{Lm} = \pm\sqrt{\frac{P_{in\_dc}}{4\pi f_{grid} L_m}(1 + \sin(2f_{grid} \times 2\pi t))} \tag{9}$$

Equation 9 provides the inductor current value used to compensate for the power at twice the grid frequency ripple at unity power factor conditions. The polarity of the inductor current may be selected as desired to minimize the conduction loss of the circuit (e.g., through the switches and components of the powertrain). FIG. 6 shows waveforms associated with characteristics of the circuit including an inductor current that is illustrative of one embodiment, in which the polarity switches each time the inductor current goes to zero.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain for a vehicle comprising:
a DC/DC converter, including an inductor and output capacitor, coupled between a traction battery and an electric drive unit; and
a controller configured to, in response to an electrical connection between the vehicle and an AC grid, couple the output capacitor and inductor in series and across terminals of the traction battery to absorb reactive power from the AC grid.

2. The powertrain of claim 1, wherein the controller is further configured to modulate switches of the converter to balance reactive power through the inductor of the converter and the output capacitor.

3. The powertrain of claim 1 further comprising a single phase charger configured to form the electrical connection between the AC grid and the DC/DC converter.

4. The powertrain of claim 1 further comprising an integrated charger configured to form the electrical connection between the AC grid and the DC/DC converter via a neutral terminal of both a first and second electric machine.

5. The powertrain of claim 1, wherein the DC/DC converter is a bi-directional DC/DC converter.

6. The powertrain of claim 1, wherein the DC/DC converter is a buck-boost DC/DC converter.

7. The powertrain of claim 1, wherein the electric drive unit includes a power inverter and an electric machine.

8. The powertrain of claim 7, wherein the controller is further configured to modulate switches of the inverter to absorb reactive power from the AC grid in at least one phase of the electric machine.

9. The powertrain of claim 7, wherein the controller is further configured to modulate switches of the inverter to absorb reactive power from the AC grid in at least one phase of the electric machine and a balancing capacitor coupled between a neutral terminal of the electric machine and a negative terminal of the inverter.

10. A method of controlling a powertrain comprising:
in response to an electrical connection between an AC grid and an electric vehicle containing the powertrain, modulating by a controller a high-side switch of a DC/DC converter according to reactive power from the AC grid to pass power though an inductor of the DC/DC converter to absorb a portion of the reactive power in an output capacitor of the DC/DC converter.

11. The method of claim 10 further comprising, in response to the electrical connection, coupling an output capacitor of the DC/DC converter between terminals of a traction battery of the powertrain.

12. The method of claim 11 further comprising, in response to the electrical connection, modulating switches of an inverter according to reactive power from the AC grid to induce a field in a wye wound electric machine of the powertrain to absorb a portion of the reactive power.

13. A powertrain for a vehicle comprising:
a controller configured to, in response to an electrical connection between the vehicle and an AC grid, couple an output capacitor and inductor of a DC/DC converter in series and across terminals of a traction battery to absorb reactive power from the AC grid.

14. The powertrain of claim 13, wherein the output capacitor and inductor of the DC/DC converter are coupled via a switch of the converter that is modulated at a frequency greater than a line frequency of the AC grid.

15. The powertrain of claim 13 further comprising a wye wound electric machine coupled with an inverter, wherein the controller is further configured to, in response to an electrical connection between the vehicle and the AC grid, modulate switches of the inverter to flow a current in the electric machine to absorb reactive power from the AC grid in at least one winding of the electric machine.

16. The powertrain of claim 15, wherein the controller is further configured to modulate the switches to balance reactive power through the inductor of the converter and the output capacitor.

17. The powertrain of claim 15 further comprising an integrated charger configured to form the electrical connection between the AC grid and the DC/DC converter via a neutral terminal of both a first and second electric machine.

18. The powertrain of claim 15, wherein the controller is further configured to modulate switches of the inverter to absorb reactive power from the AC grid in at least one phase of the electric machine and a balancing capacitor coupled between a neutral terminal of the electric machine and a negative terminal of the inverter.

19. The powertrain of claim 13, wherein the DC/DC converter is a bi-directional DC/DC converter.

20. The powertrain of claim 13, wherein the DC/DC converter is a buck-boost DC/DC converter.

* * * * *